United States Patent
Mikan et al.

(10) Patent No.: US 7,277,714 B1
(45) Date of Patent: *Oct. 2, 2007

(54) LOCATION CACHING AND EXTRAPOLATION BASED ON SPEED

(75) Inventors: Jeffrey Clinton Mikan, Cumming, GA (US); Justin McNamara, Atlanta, GA (US); Fulvio Cenciarelli, Suwanee, GA (US)

(73) Assignee: AT & T Mobility II LLC, Atlanta, GA (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/196,060

(22) Filed: Aug. 3, 2005

(51) Int. Cl.
*H04Q 7/20* (2006.01)

(52) U.S. Cl. .................. 455/456.1; 455/456.2

(58) Field of Classification Search ............. 455/456.1, 455/456.2

See application file for complete search history.

(56) References Cited

U.S. PATENT DOCUMENTS

| | | | |
|---|---|---|---|
| 7,130,641 B1 * | 10/2006 | Al-Khashti et al. | 455/456.1 |
| 2003/0101225 A1 * | 5/2003 | Han et al. | 709/206 |
| 2005/0043036 A1 * | 2/2005 | Ioppe et al. | 455/456.1 |
| 2005/0043037 A1 * | 2/2005 | Ioppe et al. | 455/456.1 |
| 2005/0130680 A1 * | 6/2005 | Northcutt | 455/457 |

* cited by examiner

*Primary Examiner*—Barry Taylor
(74) *Attorney, Agent, or Firm*—Powell Goldstein LLP

(57) ABSTRACT

A system for locating a device in a wireless network that caches a known location and estimates a location at a given time based on a speed at which the device is moving. The system initially determines plural locations and determines the speed from location. The speed and location information is stored in a cache. The system also includes a mechanism to query the cached. The system extrapolates an estimated location of the device based on the time of the query and speed of the device. Route information may be factored into the determination to account for traffic, transit or travel itinerary.

18 Claims, 3 Drawing Sheets

LOCATION CACHING AND EXTRAPOLATION BASED ON SPEED

FIELD OF THE INVENTION

The present invention is directed to determining location of a mobile device. In particular, the present invention is directed to a system for caching a location of the mobile device and determining its extrapolated location based on a speed at which the device is moving.

BACKGROUND OF THE INVENTION

Global system for mobile communication (GSM) is one of the most widely wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Determining a location of a subscriber's mobile station/handset is often desirable. However, this determination increases radio traffic to the mobile station. Also, many operators of public mobile land networks (PLMN) incur an per/transaction fee for queries to location services. Given the anticipated number of location-based services, these fees may become quite substantial.

SUMMARY OF THE INVENTION

A system for locating a device in a wireless network that caches a known location and estimates a location at a given time based on a speed at which the device is moving. The system initially determines plural locations and determines the speed from location. The speed and location information are stored in a cache. The system also includes a mechanism to query the cache. The system extrapolates an estimated location of the device based on the time of the query and speed of the device. Route information may be factored into the determination to account for traffic and/or transit conditions or travel itinerary.

DETAILED DESCRIPTION OF ILLUSTRATIVE EMBODIMENTS

Figure 1:
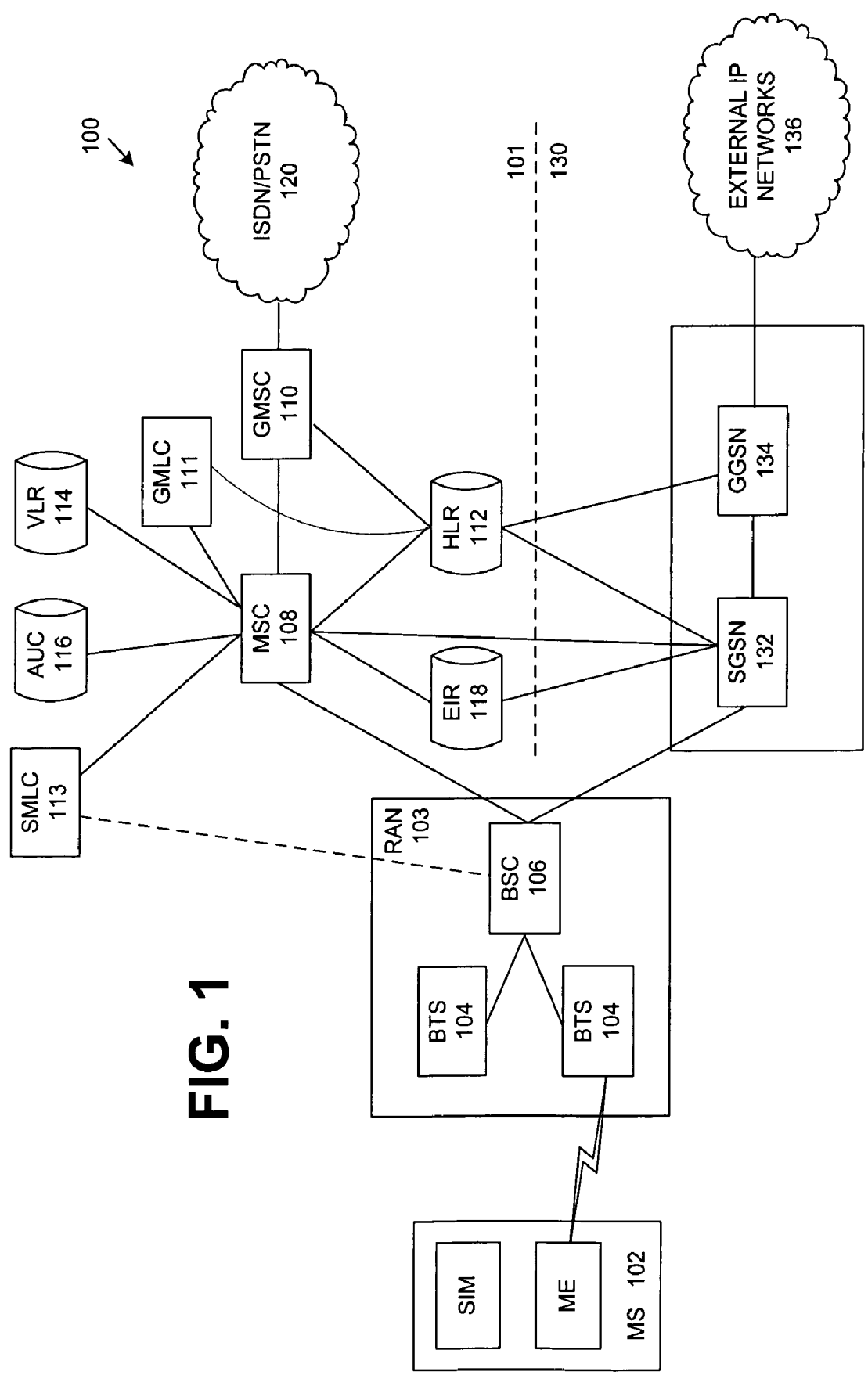
FIG. 1 is an overview of an exemplary wireless communication environment.

FIG. 1 shows a GSM/GPRS network architecture 100 the includes a GSM core network 101 and a GPRS network 130. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

Location services (LCS) are provided by a Gateway Mobile Location Center (GMLC) 111 and/or a Serving Mobile Location Center (SMLC) 113. The GMLC 111 may request routing information from the HLR 112 and send positioning requests to either the Visited Mobile Switching Centre (VMSC, not shown), a Serving GPRS Support Node (SGSN 132) or MSC 108, and receives final location estimates from the corresponding entity.

The SMLC 113 is either a separate network element or an integrated functionality in the BSC 106. The SMLC manages the overall coordination and scheduling of resources required for the location of a MS 102. The SMLC 1113 also calculates the final location estimate and estimates the achieved accuracy. The SMLC 113 may control a number of Location Measurement Unit (LMU) for the purpose of obtaining radio interface measurements to locate or help locate MS subscribers in the area that it serves.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, the serving GPRS support node (SGSN) 132 and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation modes of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS, In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

Figure 2:
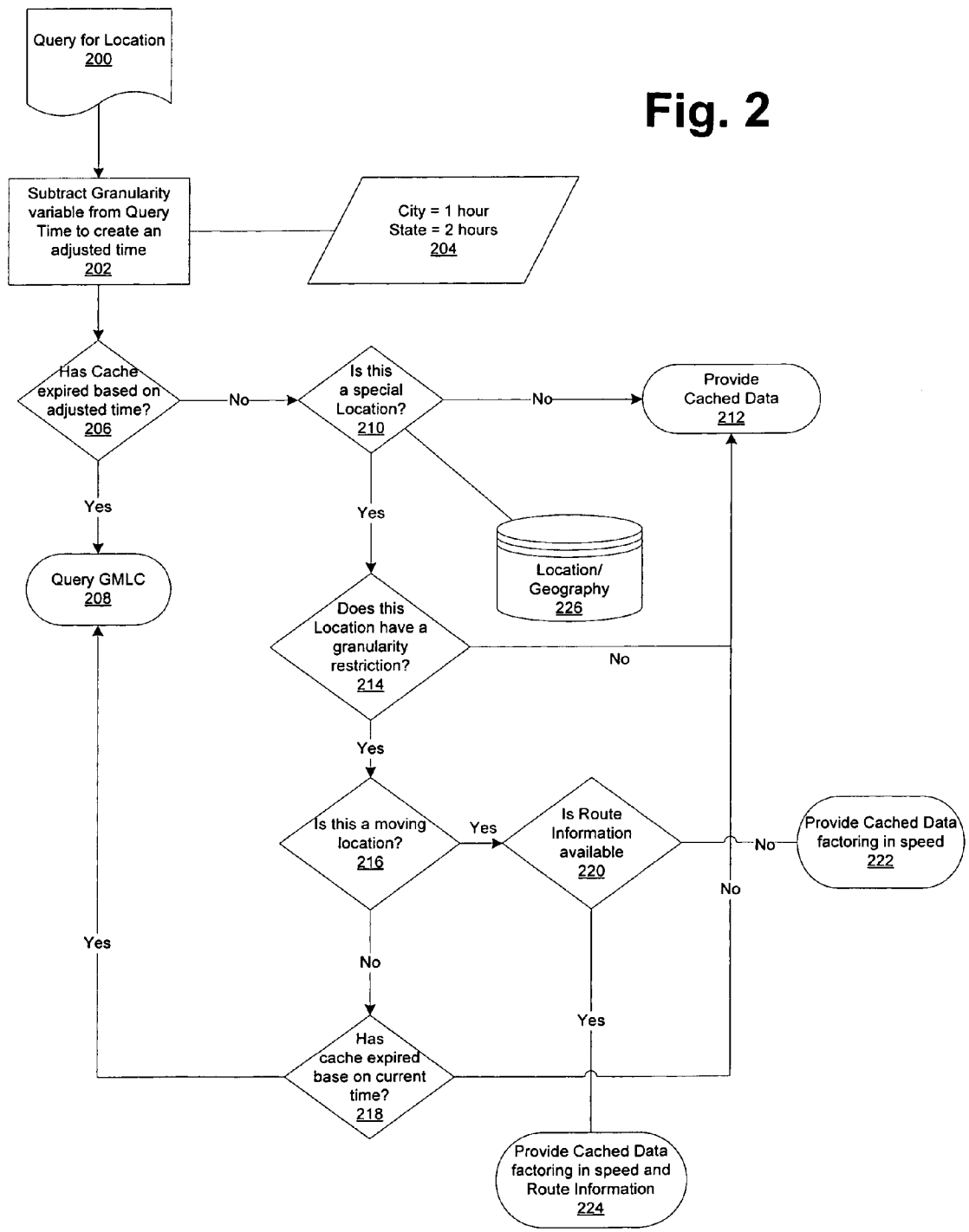
FIG. 2 is an exemplary process performed to query a location of a mobile station.

Referring now to FIG. 2, there is illustrated an exemplary process performed in a position engine to query for a location of, e.g., a MS using a cached location database. The position engine may be communicatively connected to the network 100 or with one of the elements therein discussed with reference to FIG. 1. A cached location database 226 enables the operator of the PLMN under certain circumstances to determine an estimated location of the MS, without the need to query the GMLC 111. The cached location database may also contain an estimated speed at which the MS is moving. This advantageously reduces RF traffic and costs.

The process begins at step 200, the query for location is made. At step 202, a granularity window variable is subtracted from a time that the query is made to create an adjusted time. The granularity variable is a time value that allows for proper caching based on the query request and is used to account for how long it would take for the average user to leave a geographic area. Exemplary granularities are shown in step 204. For example, a granularity variable for a ZIP code may be 5 minutes, whereas a granularity variable for a city may be 30 minutes. Larger areas, such as North Atlanta, may have a granularity variable of one hour and a state may have one of 2.5 hours. Additional (or fewer) granularity variable times maybe defined for different geographic areas.

If a service is requesting a geographic area of the size of a city, then 30 minutes would be subtract from the current time (e.g., 12:00) to create an 11:30 adjusted time. If a cache value time was 11:40, the resulting adjusted time would be less than the cache value time (i.e., 11:30<11:40).

At step 206, it is determined if the cache has expired based on the adjusted time determined at step 202. If the cache has expired, then the GMLC (or other location service) is queried at step 208 for the actual location of the MS. If the cache has not expired, then it is determined at step 210 if the location of the MS is special. The location/geography database 226 contains a listing of special locations, which may include movie theaters, restaurants, etc. where it is likely that a subscriber will not be moving for long periods of time. Alternatively, the special locations may include airports where it is likely that the subscriber may be moving a great distance between actual queries of the MS. The location/geography database 226 also includes the cached location values, as noted above.

If the location is not special, the cached location is provided at step 212 in response to the query. If the location is special, then it is determined at step 214 if there is a granularity restriction for that location. Steps 202 and 206 check to see if granularity values allows the cached value to be used. If the cached value cannot be used, there is no reason to access the location cache database. However, if the cache can be used based on the granularity, then it is determined if it the location restricts the use of the granularity window. An example of places that would have granularity restrictions are airports, high speed trains, etc.

If there is not a restriction, the cached location data is provided at step 212. If there is a granularity restriction, then it is determined at step 216 if the MS is at a moving location, such as a roadway, railroad, etc. If it is at a moving location, then at step 220, it is determined if traffic, transit, or other travel information is available about the location. According to systems and methods of this invention, it is also possible to provide the ability to link into external location determining systems when, e.g., the MS is moving. For example, traffic information may be gathered by a Department of Transportation or when a plane is in route to its destination, the airlines and FAA use a location tracking system, such as GPS, to track where a plane is at any given time. If such information available, the cached location data is provided factoring in the speed of the MS, as well as the traffic, transit or travel information.

For example, it may be determined that the MS is traveling at 65 MPH along a freeway, but an external traffic database indicates that there is road construction ahead of the cached location of the MS that is causing the average speed to drop to 20 MPH. With this information, the cached location data can be adjusted to reflect the change in speed in the construction zone.

In another example, GPS features used by the airlines in combination with the features of the present invention may track where an MS/mobile user is located at any given time. In particular, if a mobile user travels to the airport in route for a cross country trip, the user may be tracked to the airport and to the gate. It may intuitively determined that the user is standing at the gate in accordance with features of this invention (see, FIG. 3). The airline's location system may be cross referenced to determine what flight is at that the particular gate, when the plane will be leaving, and where it will be going along with any other information compiled by the airline's database.

When the user boards the plane, the user is tracked onto the plane. A location proxy may then tie into the airline's location determination system (rather than location/geography database 226) so that when the plane takes off and the MS loses signal with it serving base, the airline's location determining system will track the user as it travels in the air to its destination. When the plane arrives at its destination and the MS/mobile device registers with the communication network 100 and the network finds the mobile device of the mobile subscriber. The present invention may then detach from the airline's location determining system and continue to track the subscriber/user's as described herein. Accordingly, it is possible to integrate external location determining systems with features and aspects of this invention.

If the MS is in a moving location, but there is no traffic information available, then the cached location data is provided at step 222, factoring in the speed of the MS. Two or more queries of the MS for its actual position can be used to determine a speed at which the MS is moving. Thus, if the MS is determined to be moving along Route 400 in Georgia at 65 MPH, at steps 222 and 224, a query for the position of the MS at time equal 0 may indicate that the MS is at exit 2. A subsequent query at time equal 2 minutes may indicate that the MS is at exit 3, and so on. However, if it is know there is road construction at exit 7 that is slowing traffic to a stop, then a query at time equal 5, 6 or 7 minutes may indicate that the MS is at exit 7 until the condition has cleared.

Figure 3:
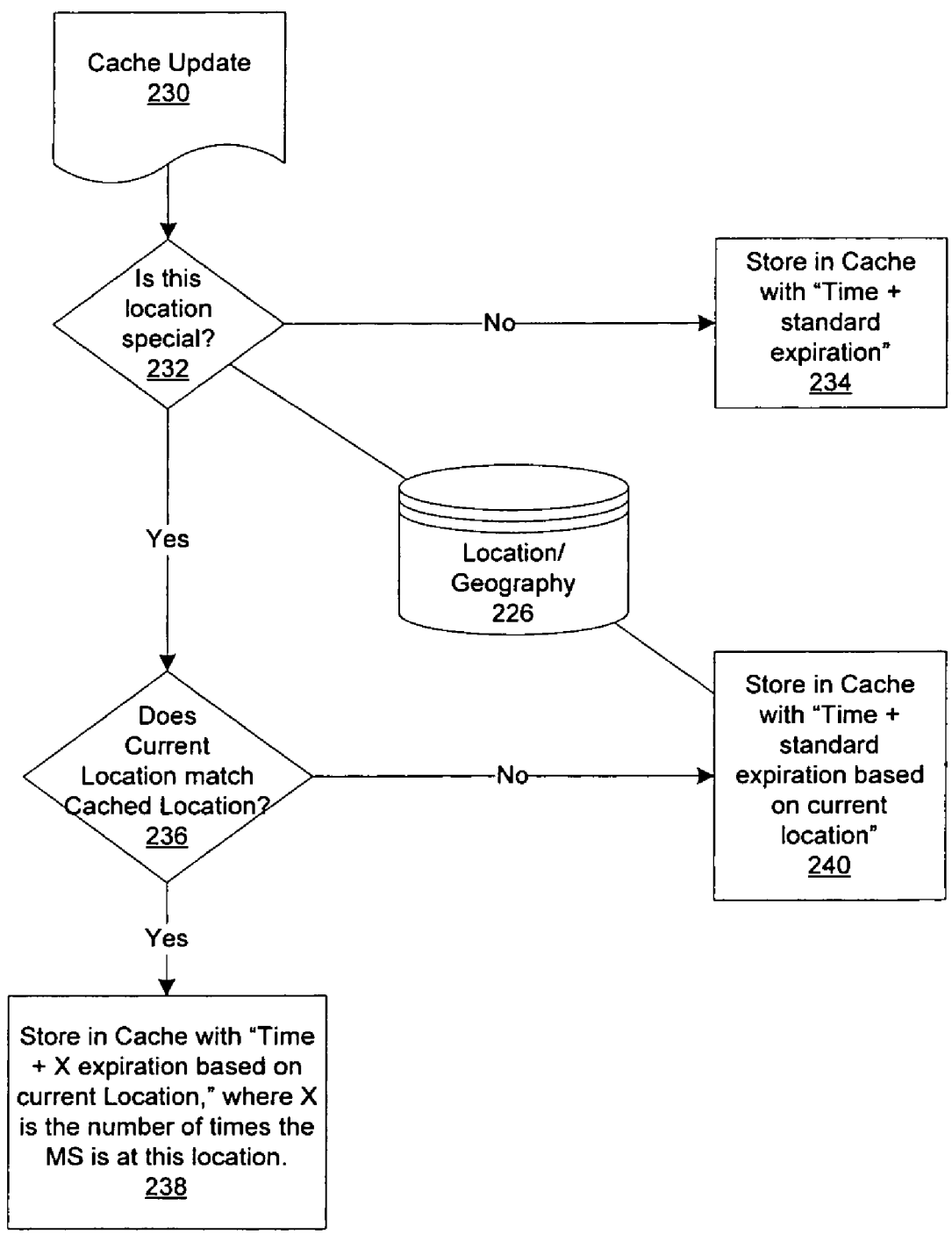
FIG. 3 is an exemplary process performed to update a location cache.

Referring now to FIG. 3, there is illustrated the exemplary process performed to update the information contained in the location cache. The process begins a step 230 where it is determined that a cache update is to be performed. Next, at step 232, it is determined if the location to be updated is special, as described above. If the location is not special, then at step 234 the location information is stored in the cache with a current time plus standard expiration increment. The standard expiration may be a value between 1 minute and 5 minutes based on the location and is used to determined for how long the value stored in the cache should be considered a good value. If the location is special (as stored in the location/geography database 226), then at step 236, it is determined if the current location of the MS matches the cached location in the database 226. If there is a match, then at step 238 the location information is stored in the cache with a time plus X expiration based on the current/special location, where X is the number of times the MS was determined to be a the special location.

If there is not a match at step 236, then the location information is stored in the cache with a time plus standard expiration based on the current/special location.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed is:

1. A method of providing information in response to a query of a database containing cached location data regarding a location of a mobile device, comprising:

caching location data regarding a location of said mobile device, said cached data including a cached time at which said data is cached;

receiving a query for said cached location data;

determining a speed at which said mobile device is moving;

determining a time of said query;

determining an adjusted time of said query, said adjusted time being based on the time of said query and a granularity variable, said granularity variable comprising a time value;

comparing said adjusted time to the cached data time;

providing said cached location data in response to said query of said database in accordance with one of said time of said query, said adjusted time of said query, and said speed of said mobile device.

2. The method of claim 1, further comprising:

receiving route information regarding a route on which said mobile device is moving; and adjusting said cached location data in accordance with said route information.

3. The method of claim 2, further comprising applying said route information to said cached location data to account for deviations of said speed of said mobile device based on data within said route information.

4. The method of claim 2, wherein said route information includes one of traffic, transit, and travel data.

5. The method of claim 4, further comprising determining a time of expiration of said cached location data in accordance with one of said route information and said adjusted time.

6. The method of claim 2, further comprising:

accessing an external database to determine said route information; and updating said cached location data in accordance with said route information.

7. The method of claim 6, further comprising:

accessing said external database at a time when said mobile device is not communicatively connected to a radio frequency network; and detaching from said external database at a time when said mobile device is communicatively connected to said radio frequency network.

8. The method of claim 1, further comprising determining a time of expiration of said cached location data in accordance with one of said speed of said mobile device and said adjusted time.

9. The method of claim 1, wherein said granularity variable is used to account for a time period needed to leave a geographic area.

10. A system for determining a current location of a moving device, comprising:

a radio network capable of communicating with said moving device;

a location database configured to cache data representing a first location of said moving device and a speed at which said moving device is moving; and a position determining engine, the position determining engine being capable of extrapolating said current location of said moving device from said location database in accordance with a time of a query to said system for said current location, said speed of said moving device, and an adjusted time, said adjusted time being based on said time of said query, said cached first location, and a granularity variable, said granularity variable being a time value.

11. The system of claim 10, wherein route information regarding a route on which said mobile device is moving is received, said position determining engine being further capable of adjusting said extrapolated current location in accordance with said route information.

12. The system of claim 11, wherein said route information is applied to said cached location data to account for deviations of said speed of said mobile device based on data within said route information.

13. The system of claim 11, wherein said route information includes one of traffic, transit, and travel data.

14. The system of claim 13, wherein an expiration of said cached data is determined in accordance with one of said route information and said adjusted time.

15. The system of claim 10, further comprising means for accessing an external database to determine said route information, said location database being further configured to update said cached data in accordance with said route information.

16. The system of claim 15, said system accessing said external database at a time when said mobile device is not communicatively connected to said radio network and said system being detached from said external database at a time when said mobile device is communicatively connected with said radio network.

17. The system of claim 10, wherein an expiration of said cached data is determined in accordance with one of said speed of said mobile device and said adjusted time.

18. The system of claim 10, wherein said granularity variable is used to account for a time period needed to leave a geographic area.

* * * * *